United States Patent [19]

Kronogard, deceased et al.

[11] Patent Number: 4,843,816
[45] Date of Patent: Jul. 4, 1989

[54] GAS TURBINE PLANT FOR AUTOMOTIVE OPERATION

[75] Inventors: Sven-Olof Kronogard, deceased, late of Lomma, by Allan Lindén, administrator; Clas-Olof Kronogard, Grabo; Hakan Kronogard, Lund, all of Sweden

[73] Assignee: AB VOLVO, Sweden

[21] Appl. No.: 175,688

[22] Filed: Mar. 24, 1988

Related U.S. Application Data

[60] Continuation of Ser. No. 866,127, Sep. 7, 1984, abandoned, Division of Ser. No. 294,527, Aug. 20, 1981, Pat. No. 4,470,261.

[30] Foreign Application Priority Data

Sep. 29, 1980 [SE] Sweden ................................ 8006806

[51] Int. Cl.[4] ................................ F02C 6/16
[52] U.S. Cl. ................................ 60/39.183; 60/39.2; 60/727; 60/747
[58] Field of Search ................ 60/39.15, 39.23, 39.27, 60/733, 746, 747, 39.826, 39.2, 39.183, 727

[56] References Cited

U.S. PATENT DOCUMENTS

| | | | |
|---|---|---|---|
| 3,869,862 | 3/1975 | Dickey | 60/39.15 |
| 3,899,886 | 8/1975 | Swick | 60/39.27 |
| 3,958,416 | 5/1976 | Hammond et al. | 60/746 |
| 4,112,676 | 9/1978 | DeCorso | 60/746 |
| 4,157,011 | 6/1979 | Liddle | 60/39.27 |
| 4,194,358 | 3/1980 | Stenger | 60/747 |
| 4,301,656 | 11/1981 | Stettler | 60/39.826 |
| 4,305,255 | 12/1981 | Davies et al. | 60/746 |

Primary Examiner—Louis J. Casaregola
Attorney, Agent, or Firm—Wegner & Bretschneider

[57] ABSTRACT

At a low part load, and at idling of a vehicle machinery it is difficult to obtain a good fuel economy and acceptable emission rates. The amount of work for driving the compressor and the auxiliary apparatuses is considerable in a gas turbine, and in view of the conditions mentioned the combustor of the gas turbine is provided with two burners, of which one is dimensioned for a fuel quantity which merely corresponds to "spare-flame" operation. An auxiliary motor means is included in the machinery and keeps, together with the "spare-flame" operation. An auxiliary motor means is included in the machinery and keeps, together with the "spare-flame" burner, the main rotor of the gas turbine running at idling and part-load. The auxiliary motor may be an electric motor, a pressure fluid motor, or a combustion engine. The compressor is provided with means for throttling the flow of air, and a control device operates this throttling means so it is effective during "spare-flame" operation.

4 Claims, 1 Drawing Sheet

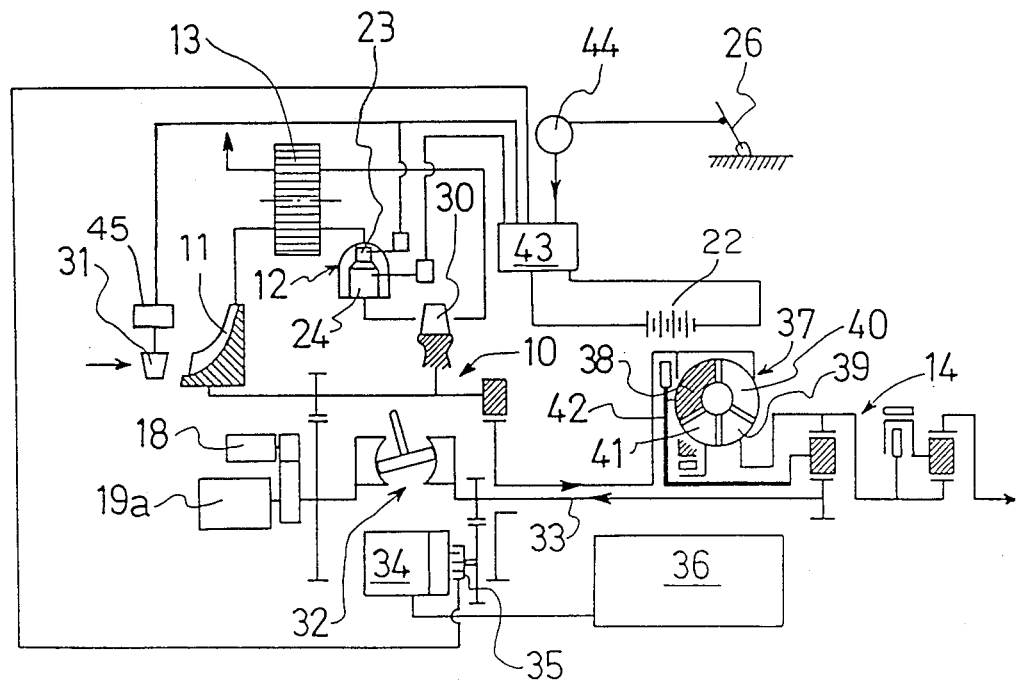

GAS TURBINE PLANT FOR AUTOMOTIVE OPERATION

This application is a continuation of U.S. application Ser. No. 866,127, filed Sept. 7, 1984, which is a division of U.S. application Ser. No. 294,527, filed Aug. 20, 1981, now U.S. Pat. No. 4,470,261.

BACKGROUND OF THE INVENTION

At a low part-load and idling it is difficult to achieve a good fuel economy and acceptable emission rates of a vehicle machinery. When said machinery comprises a gas turbine, the work for driving the compressor and auxiliary apparatuses is very heavy during said operation conditions.

For normal driving there should be a certain power available, but in order to counteract above mentioned disadvantages at part load and idle running, it is according to the present invention proposed, that the turbine, including its combustor, is so formed that a low r.p.m. it is not able alone to drive the main rotor, i.e. the rotor comprising the compressor, as well as the auxiliary apparatuses.

SUMMARY OF THE INVENTION

A gas turbine plant according to the invention has a combustor provided with two burners, of which one is dimensioned for a fuel quantity which corresponds to full power operation, while a further burner merely supplies fuel corresponding to "spare-flame" operation. An auxiliary motor means is then arranged to keep the main rotor of the gas turbine running during such an operating condition. The auxiliary motor will require small space, but is so designed that it allows high, short term power extraction at start and acceleration. The auxiliary motor means may be an electric motor, which is supplied with current from a battery, or a pressure fluid machine arranged for operating also as a pump, and connected to a pressure fluid accumulator.

The auxiliary motor may alternatively be an internal combustion engine, the exhaust conduit of which is connectable to the combustor of the gas turbine, and arranged to be charged by air tapped off from the compressor side of the gas turbine. A main feature is that the compressor is provided with means to throttle the air flow therethrough. Control means will ensure that the auxiliary motor means and the "spare-flame" burner alone are operative only with a throttled compressor, during part load and idle running, whereas the "full power" burner is operative at other times with an unthrottled compressor.

BRIEF DESCRIPTION OF THE DRAWING

The single drawing shows a gas turbine plant according to the invention, wherein the auxiliary motor is a pressure fluid motor.

DETAILED DESCRIPTION

The gas turbine of the plant may be of any arbitrary known type, having one or more rotors. The gas turbine is denoted by 10, and traditionally the plant comprises a compressor 11 and a combustor 12. Not absolutely necessary, but advisable in view of fuel economy, a heat exchanger 13 is provided. The power is via a gear box 14 transferred to a power take-off shaft. The gear box may be of any arbitrary known-type, but is preferably of the planetary type. The plant includes a generator 18, a starting motor 19 and a battery 22.

The combustor 12 is provided with a "spare-flame burner" 23, and an ordinary burner 24, dimensioned for full power. The spare flame burner 23 does not produce a sufficient amount of gas for driving the compressor and the necessary auxiliary apparatuses, (not shown). When idling and at low part load an auxiliary motor means has to be activated. The spare flame burner, however, maintains the gas turbine heated, ready for quick acceleration.

The turbine has a single rotor 30, which is mounted on the same shaft as the compressor 11, the latter being provided with adjustable inlet guide vanes 31 adapted to throttle the flow of air through the compressor.

The transmission portion between the gear box 14 and the auxiliary apparatus/compressor gear here comprises a continuously variable transmission 32 of the tilting disc type. A pressure fluid machine 34 is connected to a shaft 33 of said transmission portion via a free-wheel/clutch arrangement 35. The machine 34 is of the type which arbitrarily may operate as a pump or as a motor, and it is connected to a fluid storage tank 36. When excess energy is available within the plant, the machine 34 operates as a pump and forces fluid into the tank 36. When the gas turbine is maintained at "spare-flame" operation, or during acceleration, pressure fluid is drawn from the tank, and the machine 34 operates as a motor.

The gear box 14 is here connected over a torque converter 37 of the type comprising two turbines 38, 39 separated by a pump 40 and a stator 41, respectively. At least a clutch disc plate 42, and the turbine part 38 connected thereto are of sturdy construction, and of a material of high density, so that this part, which during the "spare-flame" condition is driven from the auxiliary motor 34, will provide a fly-wheel effect assisting during a following acceleration period.

The plant is controlled by a micro-computer 43, which is operated by the throttle pedal 26 over an electric component 44, which can be any suitable electronic component for transferring mechanical movements or displacements of the pedal into electrical signals, for providing control signals to the "spare-flame" burner 23, the main burner 24, the actuators 45 operating the guide vanes 31, the auxiliary motor means 34, and the transmission 32, the clutches 35, as well as to the gear box 14.

The embodiment described above and shown in the drawing is merely an example, and the components included therein may be varied in many ways within the scope of the accompanying claims.

The turbine part may include two or more rotors, of which one is mounted upon the same shaft as the compressor, while the other rotor mainly supplies the output torque. Throttling of the air flow through the compressor may furthermore occur by means of vanes at the compressor outlet end.

With a plant according to the invention it is possible to obtain a fuel consumption of a gas turbine plant at idling, which is less than one half of that of a present day diesel engine, and at least 30–50% lower than the consumption of the diesel engine during an operating cycle, which meets the requirements concerning emission and performance.

What we claim is:

1. A pedal controlled gas turbine plant for automotive operation, comprising:

at least one turbine rotor connectable to a power take off by a transmission;

a compressor driven by said at least one turbine rotor;

auxiliaries and a combustor, wherein said combustor being provided with a first burner for a fuel supply corresponding to part load and idle running operation, and a second burner for full power operation;

actuator controlled throttling means at the inlet of said compressor;

an auxiliary motor means connectable to said at least one rotor; and control means operable by said pedal for providing control signals for simultaneous governing of said first and second burners, and said auxiliary motor means, wherein said actuator holds the compressor throttled while said first burner and said auxiliary motor means maintain said at least one turbine rotor rotating during part load and idle running, and for operating said second burner without aid of said auxiliary motor means and with unthrottled compressor at other times.

2. A gas turbine plant according to claim 1, further comprising a transmission portion having a continuously variable component between said auxiliary motor means and said compressor.

3. A gas turbine plant according to claim 1, wherein said transmission portion includes a torque convertor having at least one clutch disc plate and a turbine part which, during part load and idling operations, is driven by said auxiliary motor means.

4. A gas turbine plant according to claim 1, wherein said auxiliary motor means comprises a pressure fluid machine operable as a pump or as a motor, a freewheel/clutch means for drivingly connecting said machine to said transmission, and a fluid storage tank connected to said machine.

* * * * *